March 3, 1964 W. R. SCHILKE 3,123,504
PROCESS AND APPARATUS FOR MAKING BATTERY ELECTRODES
Filed June 1, 1961 2 Sheets-Sheet 1
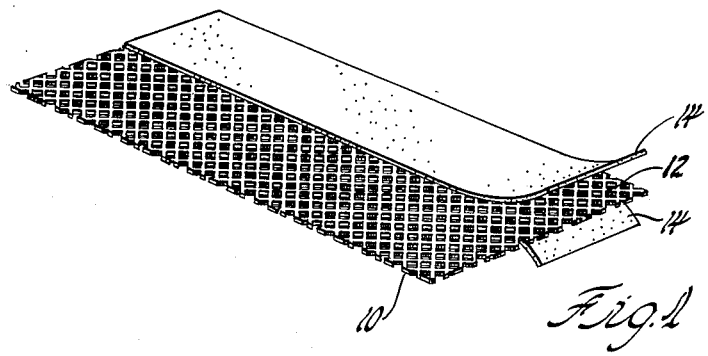
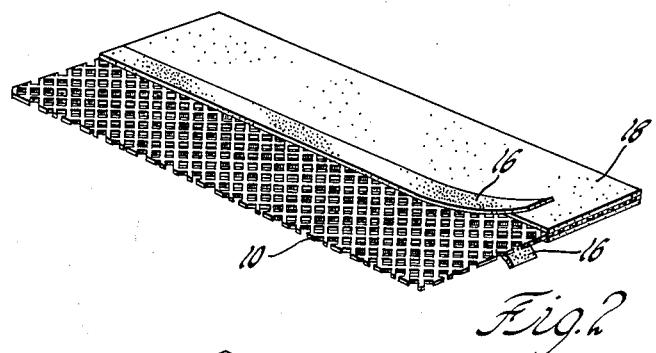
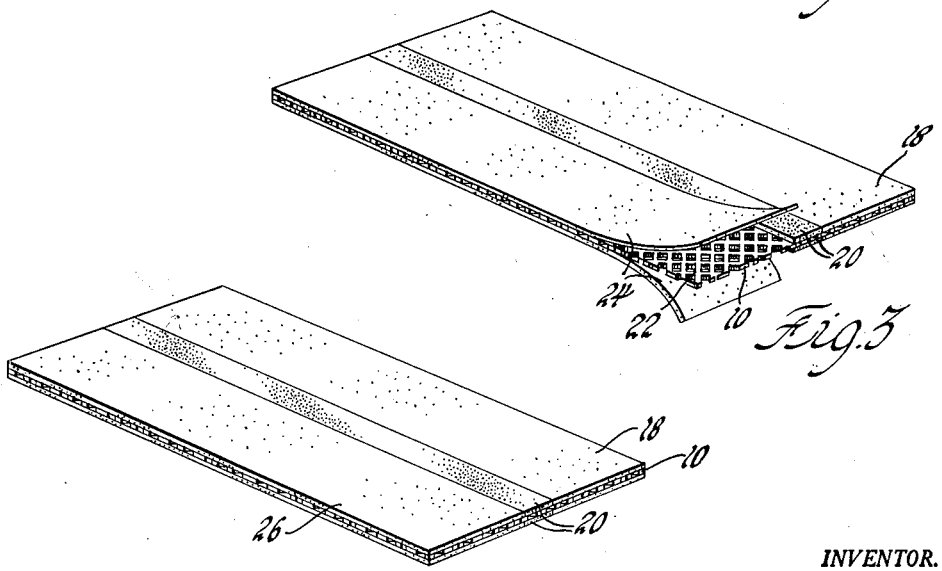
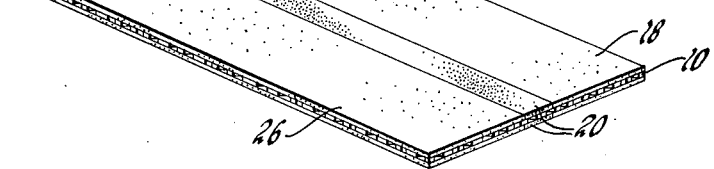
INVENTOR.
Warren R. Schilke
BY
ATTORNEY March 3, 1964 W. R. SCHILKE 3,123,504
PROCESS AND APPARATUS FOR MAKING BATTERY ELECTRODES
Filed June 1, 1961 2 Sheets-Sheet 2

INVENTOR.
BY Warren R. Schilke
ATTORNEY

United States Patent Office 3,123,504
Patented Mar. 3, 1964

3,123,504
PROCESS AND APPARATUS FOR MAKING BATTERY ELECTRODES
Warren R. Schilke, Anderson, Ind., assignor to General Motors Corporation, Detroit, Mich., a corporation of Delaware
Filed June 1, 1961, Ser. No. 114,139
6 Claims. (Cl. 136—34)

This invention relates to batteries and more particularly to a method and apparatus for making bipolar electrodes.

While bipolar electrodes have previously been known, heretofore, all of the bipolar electrodes were made with active electrode materials disposed on opposite transverse surfaces of the bipolar electrode. The copending United States patent application Serial No. 114,141, entitled "Battery," which is concurrently being filed in the names of Schilke and Watson and which is assigned to the assignee of the present invention, discloses a new type of bipolar electrode and a battery construction employing that electrode. The present invention involves both a method and apparatus for making such a bipolar electrode.

The copending application referred to involves battery constructions using bipolar electrodes in which the same surface of the electrode has two separate and independent areas containing electrochemically active materials. These materials preferably are electrochemically active with respect to one another so that a plurality of similar bipolar plates can be overlapped to form a battery having no intercell connections. More specifically, this electrode is preferably formed of a conductive matrix, laterally spaced portions of which are respectively impregnated with a positive electrode material and a negative electrode material.

It is a primary object of this invention to provide both a method and an apparatus for making bipolar electrodes.

Figure 5:
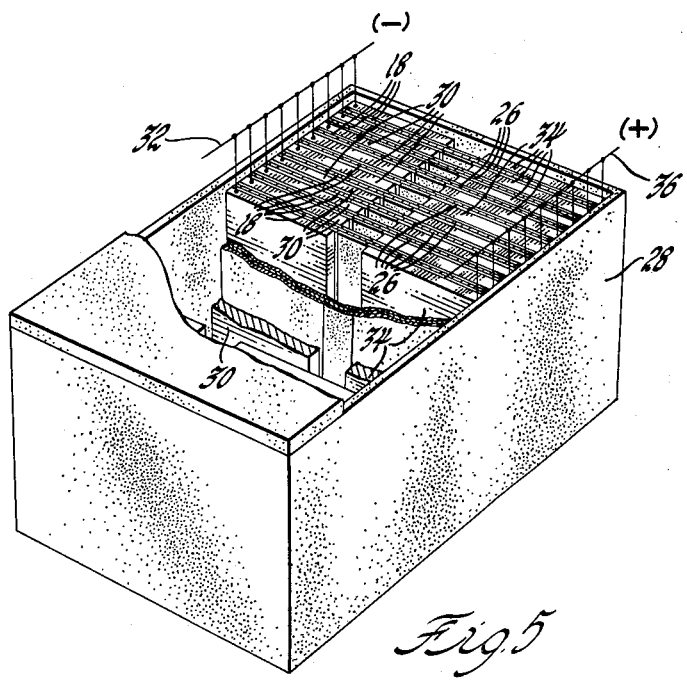
Figure 6:
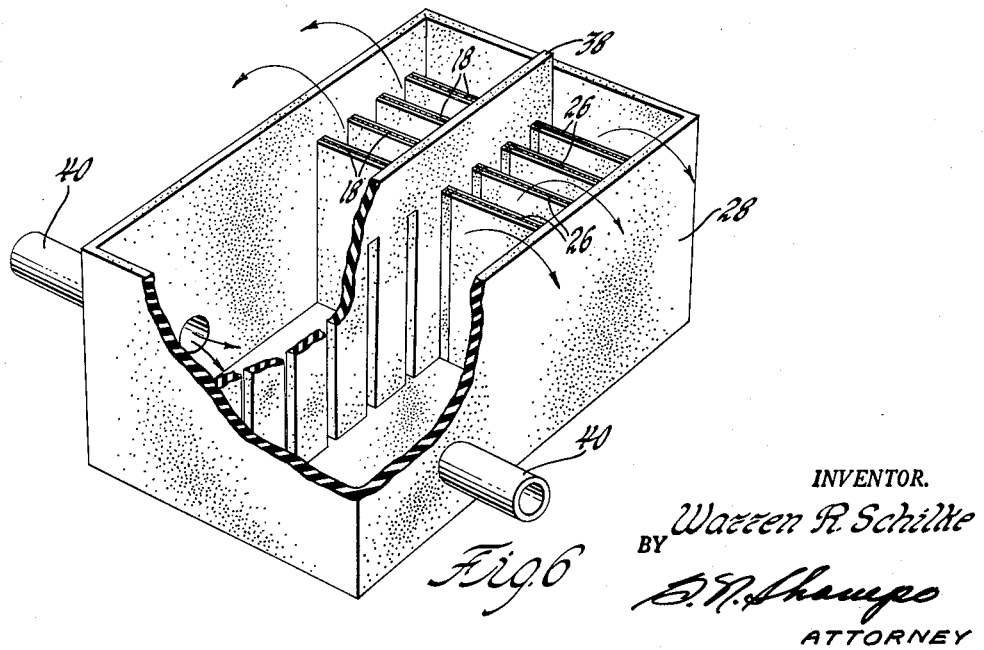

Other objects, features and advantages of the present invention will become more apparent from the following description of preferred embodiments thereof and from the drawings, in which:

FIGURES 1 through 4 schematically show the progressive steps employed in producing a flat rectangular bipolar electrode in accordance with the invention;

FIGURE 5 schematically shows the forming apparatus used to electrolyze bipolar plates in accordance with the invention; and FIGURE 6 shows an elevational view in perspective with parts broken away of means for washing my plates after they have been electrolyzed.

Briefly, the invention comprehends applying a precursor of a positive electrode material on one portion of a conductive support, applying a precursor of a negative electrode material to another portion of the support, laterally spaced from the first, and then electrolyzing the treated support to simultaneously produce both the positive and negative electrode materials in their active stage. The electrolysis is conducted in a chamber in which a plurality of bipolar electrodes are in a row spaced from one another, corresponding portions of the electrodes being aligned. Separate and independent insoluble electrodes are noncontiguously disposed, respectively, in the space between the positive and negative portions of adjacent electrodes during the electrolytic forming operation.

As shown in FIGURES 1 through 4, the bipolar electrode is formed by applying a positive electrode material, or precursor thereof, to one portion of a conductive matrix, applying a strip of insulating material adjacent the positive portion and then applying a negative electrode material, or precursor thereof, to the balance of the electrode. In this manner the positive and negative portions of the electrode are spaced from one another by means of the nonporous insulating member yet are in direct electron communication with one another by means of the conductive matrix. Then, as shown in FIGURE 5, a plurality of the bipolar electrodes produced in this manner are placed in my forming chamber so that all the negative and positive portions, respectively, of the electrodes are aligned. Insoluble electrodes are disposed between the negative portions of adjacent electrodes in the row, with porous separators between the insoluble electrodes and the negative portion of each bipolar electrode. Insoluble anodes are similarly disposed in the area between the positive portions of the adjacent bipolar electrodes in the row. After the forming operations, as shown in FIGURE 6, the insoluble electrodes and the porous spacers are removed and the bipolar electrodes are supported in spaced relationship for washing.

Serving as a specific example of the invention is the following detailed description of a method and apparatus for making silver oxide and zinc bipolar battery electrodes. While the detailed description is restricted to the production of bipolar electrodes for silver oxide-zinc batteries, it is obvious that the invention may be useful in making other bipolar electrodes for a plurality of other electrochemical systems.

The conductive support 10 for the electrode can be of any suitable material which is compatible with the electrode materials and the electro-chemical system in which the bipolar electrode is to be used. For example, in a silver-zinc battery, silver is the accepted support material. While in some instances supports made of a silver mesh have been used, I prefer to employ a grid formed of expanded silver sheet. The term "silver" is used herein to not only include pure silver but also to include any suitable silver alloy.

Due to the nature of my bipolar electrode there is ordinarily no necessity to affix terminals to the electrode. However, if desired, terminals can be secured directly to the silver grid by resistance welding.

The positive electrode portion 12 of the silver oxide-zinc bipolar electrode is preferably produced by applying silver powder to the appropriate portion of the silver grid and subsequently electrolyzing it to form silver oxide. It is preferred to use a substantially pure silver powder, 90% to 95% of which will pass a 325 mesh screen. Silver powder and polyethylene are blended on a mill at a temperature of about 300° F. After blending, the mixture is cooled. It is granulated and then calendered at a temperature of about 220° F. into sheets of appropriate thickness.

The sheets of the polyethylene-silver powder mixture are then cut into small pieces of appropriate dimensions. Two pieces 14 of this cut material, as shown in FIGURE 1, are then used to form a sandwich with the silver grid. The grid is sandwiched between two pieces of the material and the sandwich is then compressed at a suitable temperature to bond the polyethylene of the two pieces together and consolidate the assembly.

The consolidated sandwich is then sintered at a temperature of approximately 1000° F. for about one-half hour and then allowed to cool. The sintering operation not only bonds the silver powder together but also burns out the polyethylene filler, which served as a temporary binder and filler. This portion of the bipolar plate is thus ready for electrolytic forming.

Reference is now made to FIGURE 2. When the bipolar plate has cooled sufficiently after the sintering operation, strips 16 of polyethylene, or the like, are placed on opposite surfaces of the grid adjacent the portion 18 having the sintered silver powder. The two strips are then compressed together with heated platens to fuse them together to form a nonconductive divider 20 as shown in FIGURE 3.

As described in the aforementioned copending United States patent application Serial No. 114,141, filed concurrently herewith, the specific configuration of the plastic divider 20 can be varied. A particular cross-sectional configuration can be conveniently imparted to the divider strip while the two halves thereof are being fused together. After the divider strip has been secured to the grid, the grid is ready to receive the negative electrode material.

The negative electrode material is formed of a mixture containing a water-soluble polyethylene, zinc oxide and mercuric oxide. Mercuric oxide is generally employed to reduce the tendency of the negative plates to evolve hydrogen gas during battery discharge. The mixture is blended on a mill at a temperature of about 240° F. After the mixture has been sufficiently blended, it is cooled and then calendered at a temperature of approximately 200° F. to produce a sheet of the desired thickness. After the sheet has cooled it is trimmed into pieces of the desired dimensions.

The remaining portion 22 of the silver grid is then sandwiched between two pieces 24 of the polyethylene-zinc oxide and mercuric oxide mixture. The sandwich, thus formed, is then compressed at a suitable temperature to bond the polyethylene of the two pieces together through the apertures of the grid and consolidate the assembly. The consolidated sandwich is allowed to cool whereupon preparation of the bipolar plate prior to electroforming is completed. FIGURE 4 shows the electrode with the preliminary prepration complete, the negative portion 26 having now been consolidated.

In forming each portion of the electrode it is to be understood, of course, that the particular proportions of materials used in the mix, as well as the thickness of the sheet employed, can be varied considerably to attain the desired active material distribution on the finished electrode. The specifically preferred distribution which is desired is no more material to the present invention than it is to any other method of making battery plates. As the desired electrode performance governs the active material distribution, it will also determine to a considerable extent the preferred mix proportions and sheet thicknesses.

Referring now to FIGURE 5, there is shown a container 28 in which are disposed a plurality of bipolar electrodes formed as hereinbefore described. The bipolar electrodes are correspondingly arranged so that the positive portions 18 of all of them are aligned on the same side of the container. Nickel electrodes 30, which are encased in suitable porous separators (not shown) are disposed between the negative portions of each of the adjacent bipolar electrodes in the container. Similar electrodes are also used at each end of the row. Each of the nickel electrodes is connected to a negative bus bar 32.

Analogously, nickel electrodes 34 are also disposed between the negative portions 26 of the adjacent electrodes. They are also disposed at both ends of the row of negative portions. As with the electrodes 30 for the positive portions, these electrodes are encased in a suitable porous separator material (not shown). However, these electrodes are connected to a positive bus bar 36. The tank is filled with an aqueous electrolyte solution (not shown) containing approximately 10% to 20%, by weight, potassium hydroxide.

The bipolar electrodes are electrolyzed under a suitable potential for a desired period of time. A potential of about 1.0 to 3.0 volts generally can be used. However, the particular potential preferred, as well as the duration of forming, are variable and depend upon the nature of the electrode being formed.

As shown in FIGURE 6, after the plates have been formed a slotted support member 38 is inserted in the container 28. The support member maintains the plates spaced from one another to permit adequate rinsing action. The dummy electrodes 30 and 34 are removed from the forming container, the forming electrolyte is drained and the plates are then rinsed. Continuous rinsing can be attained by means of conduits 40 attached to a lower part of the side walls of the container whereby rinse water continuously is injected into the chamber to overflow the upper walls thereof. While only continuous rinsing may be desired, in many instances it is preferred to also employ periods of nonagitated soaking between periods of overflow rinsing. For example, four ten-minute periods of nonagitated soaking, each of which is followed by equal periods of overflow rinsing, generally produce satisfactory results. It is during the rinsing of the formed plates that the water-soluble polyethylene filler for the zinc oxide is leached out. This material is insoluble in alkaline solutions and, therefore, is not leached out during the electrolytic forming operation.

While the invention has been described in connection with certain specific examples thereof, no limitation is intended thereby except as defined in the appended claims.

I claim:

1. A device for forming bipolar battery plates which are bipolar with respect to at least one major surface thereof, said device comprising a container, means in said container for supporting at least two of said bipolar plates in spaced arrangement with said bipolar major surfaces in a generally parallel, facing relationship whereby corresponding portions thereof are generally aligned, a forming electrode for noncontiguous disposition between the negative portions of said facing bipolar plates, a forming electrode for noncontiguous disposition between the positive portions of said facing bipolar plates, and means for applying negative and positive potentials, respectively, to said electrodes.

2. A method of making a bipolar electrode which has positive and negative electrode materials on the same surface thereof, said method comprising the steps of applying a precursor of a positive electrode material to a first portion of a surface of a conductive support, applying a precursor of a negative electrode material to a second portion of said surface, said materials being laterally spaced from one another on said surface so as to be noncontiguous to one another, immersing said support in a forming electrolyte, immersing a first electrode in said electrolyte adjacent the positive electrode material on said support, immersing a second electrode in said electrolyte adjacent the negative electrode material on said support, and thereafter applying positive and negative potentials, respectively, to said first and second electrodes to simultaneously electrolyze both materials on said support, wherein said support provides electron communication between said materials for the electrolysis.

3. A method of making a bipolar electrode which has positive and negative electrode materials on the same surface thereof, said method comprising the steps of applying a precursor of a positive electrode material to a first portion of a surface of a generally planar conductive matrix, applying a precursor of a negative electrode material to a second portion of said surface, said precursor materials being laterally spaced from one another on said surface so as to be noncontiguous one another, immersing said matrix in a forming electrolyte, immersing a first forming electrode in said electrolyte adjacent the positive electrode material on said matrix, immersing a second forming electrode in said electrolyte adjacent the negative electrode material on said matrix, and thereafter applying positive and negative potentials, respectively, to said first and second electrodes to simultaneously electrolyze both materials on said matrix, wherein said matrix provides electron communication between said materials for the electrolysis.

4. A method of making a bipolar electrode which has positive and negative electrode materials on the same surface thereof, said method comprising the steps of applying a material containing silver powder to a first portion of the surface of a conductive matrix, applying a material containing zinc oxide to a second portion of said surface, said materials being noncontiguously laterally disposed on said surface, immersing said matrix in a potassium hydroxide-forming electrolyte, immersing a first electrode in said electrolyte adjacent the silver powder material on said matrix, immersing a second electrode in said electrolyte adjacent the zinc oxide material on said matrix, and thereafter applying positive and negative potentials, respectively, to said first and second electrodes to simultaneously electrolyze both materials on said matrix, wherein electron communication between said materials for the electrolysis occurs through said conductive matrix.

5. A method of making bipolar electrodes which comprises the steps of applying a precursor of a negative electrode material to a first portion of a surface of a generally planar conductive support, applying a precursor of a positive electrode material to a second portion of said surface, said surface portions being mutually laterally spaced so as to be noncontiguous one another, similarly applying said precursors to a surface of at least one additional generally planar conductive support, immersing said supports in spaced relationship in a forming electrolyte with said surfaces facing one another, generally aligning corresponding portions of said supports in said electrolyte, immersing a first electrode in said electrolyte between facing positive portions of said aligned supports in spaced relationship therewith, immersing a second electrode in said electrolyte between facing negative portions of said aligned supports in spaced relationship therewith, and thereafter applying positive and negative potentials, respectively, to said first and second electrodes to simultaneously electrolyze both materials on each of said supports.

6. The method of making bipolar electrodes having a silver-zinc battery, said method comprising the steps of applying a silver powder-polyethylene mixture to a first portion of a surface of a generally planar conductive matrix, heating said matrix to sinter said silver and burn out said polyethylene, applying a mixture containing zinc oxide and a water-soluble polyethylene to a second portion of said surface, said surface portions being laterally spaced from one another on said surface so as to be noncontiguous one another, similarly applying said materials to a surface of at least one additional generally planar conductive matrix, immersing said matrices in spaced relationship in a potassium hydroxide-forming electrolyte with said surfaces facing one another, generally aligning corresponding portions of said matrices, immersing a first forming electrode in said electrolyte between the facing silver powder portions of said aligned matrices in spaced relationship therewith, immersing a second forming electrode in said electrolyte between the facing zinc oxide portions of said aligned matrices in spaced relationship therewith, and thereafter applying positive and negative potentials, respectively, to said forming electrodes to simultaneously electrolyze both materials on each of said matrices.

References Cited in the file of this patent

UNITED STATES PATENTS

| | | |
|---|---|---|
| 726,468 | Scott | Apr. 28, 1903 |
| 1,026,857 | Fixen | May 21, 1912 |
| 2,560,836 | Zachlin | July 17, 1951 |
| 2,590,703 | Homan | Mar. 25, 1952 |